US012762558B2

(12) United States Patent
Nicholson et al.

(10) Patent No.: US 12,762,558 B2
(45) Date of Patent: Oct. 13, 2026

(54) HIERARCHICAL AND MULTI-LABEL TRANSACTION CLEANSING AND CATEGORIZATION

(71) Applicant: Digital First Holdings LLC, Atlanta, GA (US)

(72) Inventors: Chase Tyler Nicholson, Atlanta, GA (US); Pavan Kumar Vattyam, Atlanta, GA (US); Kyle Alexander King, Bogart, GA (US); Thomas Philip Murray, New York, NY (US); Kun Zhu, Smyrna, GA (US)

(73) Assignee: Digital First Holdings LLC, Atlanta, GA (US)

( * ) Notice: Subject to any disclaimer, the term of this patent is extended or adjusted under 35 U.S.C. 154(b) by 19 days.

(21) Appl. No.: 18/428,777

(22) Filed: Jan. 31, 2024

(65) Prior Publication Data

US 2025/0245663 A1 Jul. 31, 2025

(51) Int. Cl.

| | |
|---|---|
| ***G06Q 40/06*** | (2012.01) |
| ***G06N 3/045*** | (2023.01) |
| ***G06N 3/0455*** | (2023.01) |
| ***G06N 3/0464*** | (2023.01) |
| ***G06N 3/08*** | (2023.01) |
| ***G06N 3/084*** | (2023.01) |
| ***G06N 3/0895*** | (2023.01) |
| ***G06N 3/09*** | (2023.01) |
| ***G06N 20/00*** | (2019.01) |
| ***G06Q 20/40*** | (2012.01) |
| ***G06Q 40/12*** | (2023.01) |

(52) U.S. Cl.
CPC ..... *G06Q 20/4014* (2013.01); *G06Q 20/4015* (2020.05)

(58) Field of Classification Search
CPC ....................... G06Q 20/4014; G06Q 20/4015
USPC ............................................................ 705/44
See application file for complete search history.

(56) References Cited

U.S. PATENT DOCUMENTS

| | | | | |
|---|---|---|---|---|
| 11,348,124 | B2 * | 5/2022 | Ghosh | G06Q 20/3224 |
| 2019/0012671 | A1 * | 1/2019 | Shami | G06Q 20/4016 |
| 2019/0205993 | A1 * | 7/2019 | Rodriguez | H04L 67/535 |
| 2022/0076231 | A1 * | 3/2022 | Farrell | G06Q 20/34 |
| 2025/0104045 | A1 * | 3/2025 | Raghavan | G06Q 20/401 |

* cited by examiner

*Primary Examiner* — Clifford B Madamba
(74) *Attorney, Agent, or Firm* — Schwegman Lundberg & Woessner, P.A.

(57) ABSTRACT

A transaction string of data for a transaction is received by a financial institution (FI) server from a retailer server during a payment for the transaction by a customer at a location. The transaction data is provided by the FI server to a cloud service where the data is cleansed and normalized. A first machine learning model (model) is processed to label entities in the normalized transaction data. A second model is processed to assign hierarchical-based classifications for each of the identified entities in the normalized transaction data. The entities and hierarchical-based classifications are provided back to the FI server to associate with and/or link to the payment for the transaction.

15 Claims, 4 Drawing Sheets

HIERARCHICAL AND MULTI-LABEL TRANSACTION CLEANSING AND CATEGORIZATION

BACKGROUND

Transaction cleansing and categorization are essential for financial institutions (FIs) as it helps customers monitor their spending patterns while also enabling Fis to gain insights through analytics. Although few companies provides transaction cleansing and categorization services, the ones that do demand hefty fees.

DETAILED DESCRIPTION

Figure 1:
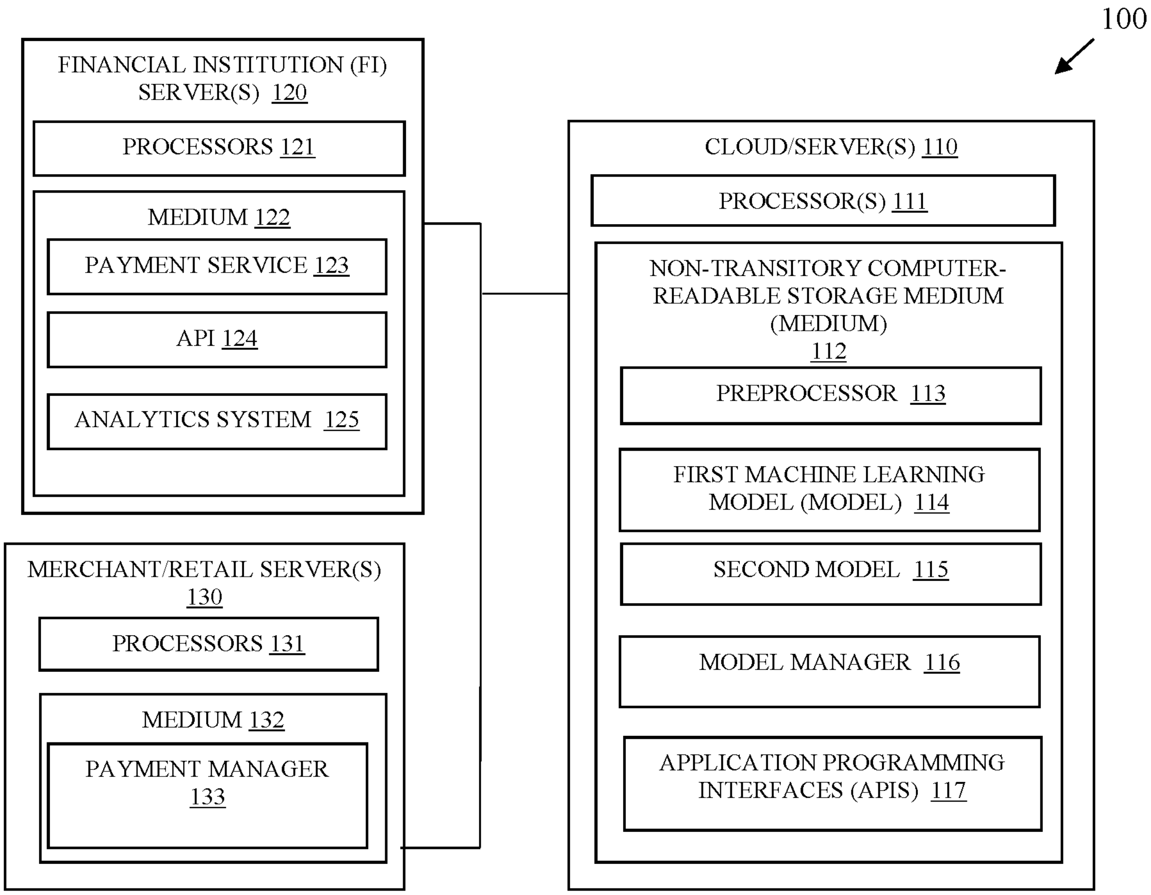
FIG. 1 is a diagram of a system for hierarchical and multi-label transaction cleansing and categorization, according to an example embodiment.

Financial Institutions (Fis) often receive unclear transaction descriptions for their customers from the merchants. The description can include the name of the merchant along with the payment method and location of the transaction. To extract information about smaller merchants, a rule-based approach is insufficient. A rule-based approach only provides a one-dimensional picture of the transaction, neglecting any embedded hierarchy. Moreover, a limit of one category per transaction can limit the scope of analytics possible. As a result, Fis can pay upwards of $200,000 for third-party vendors to handle their transaction cleansing and categorization for their customers' transaction data. Categories also vary across different types of institutions, such as digital banking with its own categories causing variability across the industry. Without any standard merchant catalogue, understanding customers' spending patterns for Fis is challenging. Furthermore, traditional categorization requires the probabilities of all potential categories identified to sum to 1.

The teachings provided herein alleviate these shortcomings by using multiple machine learning models (hereinafter just "models) to identify from the raw transaction data or text provided for a transaction entity names and classification categories. A first model is trained on non-labeled content to resolve and understand contexts of words left to right. The first model is fine tuned to complete a variety of natural language tasks. In an embodiment, the first model is fine tuned on named entity recognition (NER) and text classification. In an embodiment, the first model is a bidirectional encoder representations from transformers (BERT) natural language model trained to represent words in numerical form in context of a sentence.

The first model is taught to extract the name of the merchant from the raw or "unclean" transaction data of a transaction sent by a merchant to a FI for a transaction. Each "word" in the transaction data or transaction string is classified as its own entity. Merchants are labeled as an organization with an ORG entity label and the transaction location with a LOC label. During training of the first model, the model adjust the embeddings to learn on the context of where the merchants will be in the transaction strings as well as learning unimportant words present in the transaction strings. The adjusted embeddings of each word are passed through a classification layer which classifies each label or token in the corresponding transaction string as "merchant," "location," or "nothing." The extracted entity is then based into a second model fine tuned on sequence classification. In an embodiment, the second model is another or second BERT model.

The second model is a merchant classification model trained using labeled transaction that are remapped from merchant category codes (MCCs) to predefined categories. Instead of training on each word passed in from the transaction strings, the second model trains on a separate token (SEP) which includes embedded information of all the words associated with a given merchant. The embedded information for the SEP are passed through a classification layer of the second model which predicts the categories.

The classification head for the second model is customizable. As a result, different types of modeling can be performed to obtain more information out of categorization. Thus, the categorization can include more than just one category, which conventionally has not been possible. The sum of the category probabilities do not have to equal 1. Any combination of category probabilities are possible include categories assigned all 0 probabilities and all 1 probabilities. This increases categorization flexibility.

Further, traditional categorization does not allow for a hierarchy of category labels whereas the teachings herein do provide for such hierarchical embeddings. This allows for nuance or fine grain categorization. Thus, the teachings provided combine multi-categorization labeling and embedded hierarchical categorization together to provide both categorization flexibility and fine-grain nuance categorization. This approach is particularly beneficial to large retailers as they are the businesses most likely to have multiple types of categorizations. The approach taken herein also allows for a multi-dimensional solution that is not possible when just using a multi-categorization labeling approach and not possible when just using a fine-grain nuance categorization.

The teachings provided herein provided improved capabilities for customers to track their expenses and spending habits over time through access to the transaction classification techniques provided. Additionally, Fis can reduce expense associated with third-party transaction data cleansing and categorization while at the same time gain a better understanding of their own customers. The enhanced transaction data classification herein also enables further data science and machine learning improvements to provide better transaction data analytics and improved customer and/or product predicted purchasing behaviors and/or relationships, which heretofore has not been possible in the FI or retail industry.

FIG. 1 is a diagram of a system, platform, and/or framework 100 (hereinafter just system 100") for hierarchical and multi-label transaction cleansing and categorization, according to an example embodiment. Notably, the components are shown schematically in simplified form, with only those components relevant to understanding of the embodiments being illustrated.

Furthermore, the various components (that are identified in system 100) are illustrated and the arrangement of the components are presented for purposes of illustration only. Notably, other arrangements with more or less components are possible without departing from the teachings of hierarchical and multi-label transaction cleansing and categorization as presented herein and below.

System 100 includes a cloud/server 110 (hereinafter just “cloud 110”), a plurality of FI servers 120, and a plurality of merchant servers 130. Cloud 110 includes at least one processor 111 and a non-transitory computer-readable storage medium (hereinafter just “medium”) 112, which includes instructions for preprocessor 113, a first model 114, a second model 115, a model manager 116, and application programming interfaces (APIs) 114. The instructions when provided to and executed by processor 111 cause processor 111 to perform processing, functions, and/or operations discussed herein and below with respect to 113-117.

Each FI server 120 includes at least one processor 121 and a medium 122, which includes instructions for a payment service 123, an API 124, and an analytics system 125. The instructions when provided to and executed by processor 121 cause processor 121 to perform the processing, functions, and/or operations discussed herein and below with respect to 123-125.

Each merchant/retail (hereinafter just “merchant”) server 130 includes at least one processor 131 and a medium 132, which includes instructions for a payment manager. The instructions when provided to and executed by processor 131 from medium 132 cause processor 131 to perform the processing, functions, and/or operations discussed herein and below with respect to 133.

System 100 is configured to operate in real time or in batch mode. In real-time mode, transaction data or a transaction string I sent from a merchant server 130 during a payment portion of a transaction to payment service 123, payment service 123 uses API 124 to forward the transaction string to model manager 116. In batch mode, analytics system 125 uses API 124 to send a preconfigured amount of transaction strings representing payment processing for customers of a given FI over a predefined period of time to model manager 116. Whether in real-time mode or batch mode, model manager 116 receives the corresponding transaction string(s), interacts with preprocessor 113, first model 114, and second model 115, and returns the multi-label and hierarchical categorizations for each transaction string back to analytics system 125 using API 117.

For each transaction string received, model manager 116 uses preprocessor 113 to remove any noise text or irrelevant information. This includes stop words, punctuation marks, and special characters. Preprocessor 113 also normalizes the text after removal of the noise words into a standard format that is independent of any given merchant or FI.

In an embodiment, model manager 116 uses a combination of natural language processing (NLP) algorithms and deep learning algorithms (such as models 114 and 115) to clean, categorize, and classify transaction data or strings. This is done using “transaction embedding,” which involves represent each transaction and its corresponding transaction data as a vector in high or multi-dimensional space, where each dimension corresponds to a specific feature or attribute of the corresponding transaction.

Once the transaction string is cleansed, model manager 116 uses first model 114 to extract and determine the merchant associated with the corresponding transaction. That is, each entity in the cleansed transaction string is identified and provided as output via an entity labeled string by the first model 114.

Next, model manager 116 transforms each transaction string into a high-dimensional vector using an embedding algorithm, such as word-to-vector (Word2Vec) or GloVe. Notably, other embedded algorithms or customized embedding algorithms can also be used. The result of processing the embedding algorithm provides semantic meaning to a given transaction and its transaction string and allows for the detection of similarities and differences between other transactions and their transaction strings within multi-dimensional space.

Model manager 116 then passes the embedded transactions and their corresponding normalized transaction strings to second model 115 as input for purposes of classifying the transactions via their transaction strings into hierarchical categories. Second model 115 is a deep learning algorithm, such as a hierarchical convolutional neural network (HCNN). The second model 115 is trained on a set of labeled data that includes hierarchical category information. Second model 115 learns to classify transactions and their corresponding transaction strings into appropriate categories based on their embedded vectors. Notably, this approach differs from traditional clustering because hierarchical tags can create fine-grain nuance that standard models cannot track. For example, a standard model might have a sports label category, an entertainment label category, and a retail label category. But those label categories only produce a single possible label category as output. Conversely, second model 115 can output multiple labeled categories such as “entertainment: sport.” Or “retail: sport,” which provides further nuance and fine-grain capabilities to the multi-labeling and hierarchical classification techniques provided herein.

Model manager 116 assigns multiple labels classification to each given transaction and its transaction string using second model 115. In an embodiment, second model 115 is a multilabel classification algorithm, such as a binary relevance or classifier chain algorithm. This allows for the transactions to be classified into multiple categories simultaneously. Again, this differs from traditional categorization approaches with the allowance of independence between label probabilities. Traditional categorization approaches have a rule that the sum of all probabilities for a label (e.g., category) space must equal 1. This is not so with the teachings provided herein, where a single transaction and corresponding transaction string can have two or more possible labeled classifications. Additionally, with the teachings provided herein there can be a transaction with no categorized labels. This helps improve the second model’s precision and recall tremendously. Traditional models tend to have the problem of the “dump” label that is assigned to anything that the traditional models become confused about; they just lump confusion into a “dump” label category. Such is no longer an issue with second model 115.

Model manager 116 then performs cascading to an endpoint on each transaction and its corresponding transaction string. Top level labels are passed through the top of the hierarchy and processed through second model 115. The labels are evaluated and if the probability of that label is beyond a threshold, it cascades further down into a second model subspace where another classification takes place. Continually cascading until there are no more subspaces to cascade through.

Once cascaded through the second model 115 for each top level labels, the outputs from the second model 115 is a multi-label, hierarchical classification of each transaction based on its corresponding transaction string. An example of this is illustrated and discussed in FIG. 2 below.

By using transaction embedding in combination with hierarchy of classifications and multi-labels, the semantic meaning of the transactions are captured and used for fine-grain and nuanced categorizations and classifications. The combination of NLP techniques and deep learning also provided a more accurate and efficient way to clean, categorize, and classify transaction data, which can be applied in a variety of domains, such as via analytics system 125 on a given FI's server 120. System 100 combines multi-categorization labeling and embedded hierarchical categorization together to provide both categorization flexibility and fine-grain nuance categorization. Neither multi-categorization labeling nor embedded hierarchical classification standing alone can achieve the fine-grain and nuanced multi-labeling and hierarchical classification of system 100.

Figure 2:
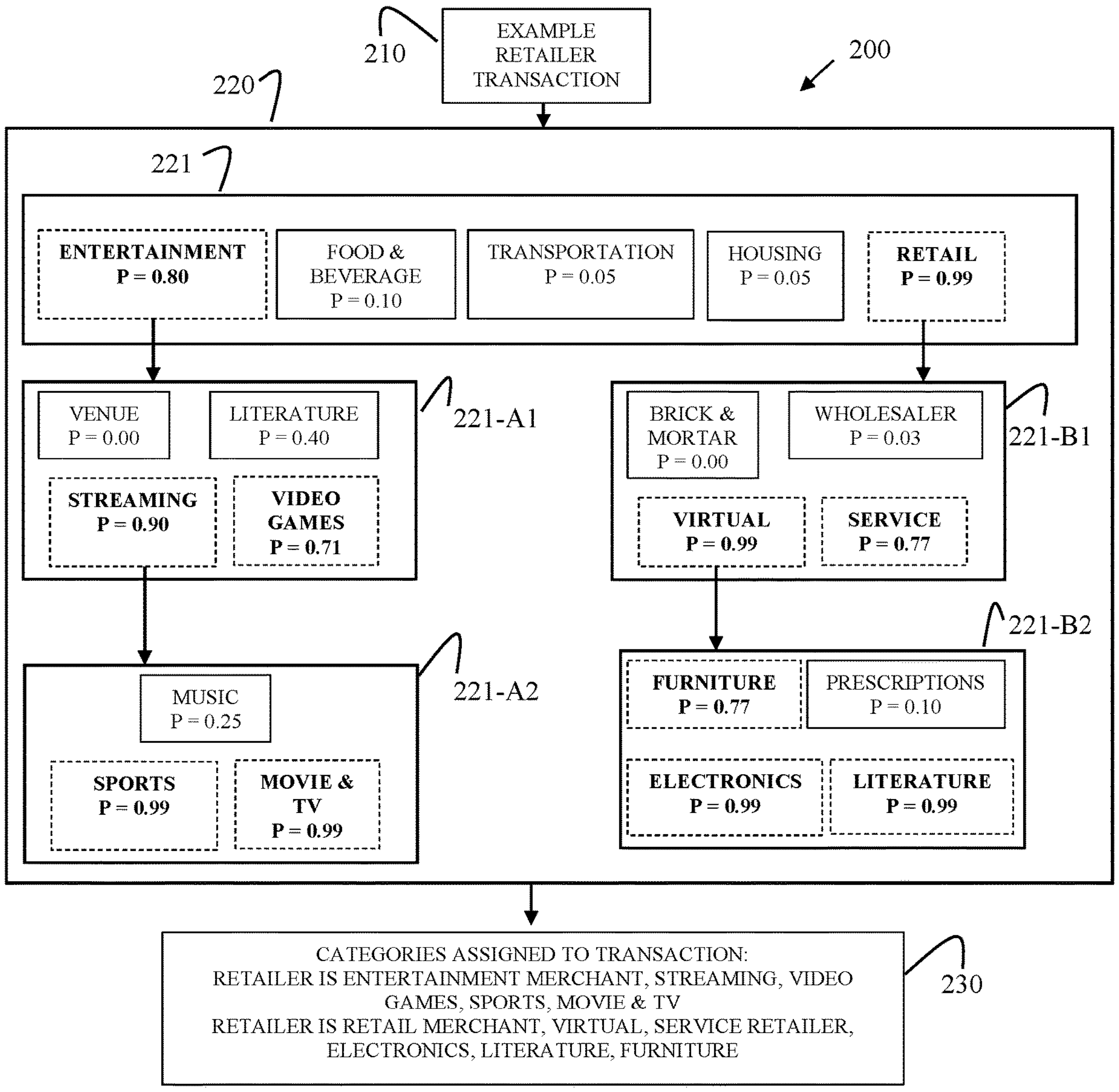
FIG. 2 depicts an example graphic illustrating hierarchical and multi-label transaction categorization for an example transaction, according to an example embodiment.

FIG. 2 depicts an example graphic illustrating hierarchical and multi-label transaction categorization 200 for an example transaction, according to an example embodiment. The example, illustrated in FIG. 2 assumes that model manager 116 has already used preprocessor 113 to cleanse a transaction string for an example retailer transaction 210 associated with a corresponding transaction string.

At 221, model manager 116 passes the transaction string as input to first model 114 which returns entity designations of entertainment, food and beverage, transportation, housing, and retail. Because the probabilities assigned to entertainment and retail exceed a predefined threshold, model manager 116 passes the transaction string twice to second model 115. Model manager 116 provides the transaction string with the entertainment entity label to second model 115 at 221-A1 and provides the transaction string with the retain entity labels to second model 115 at 221-B1. The entertainment entity label causes second model 115 to use a hierarchy associated with an entertainment merchant or retailer and the retail entity label causes second model 115 to use a hierarchy associated with a retailer merchant. Second model 115 identifies probabilities that exceed a threshold for the entertainment entity labels at 221-A1 as streaming and video games. Second model 115 identifies probabilities that exceed a threshold for the retail entity labels at 221-B1 as virtual and service. Second model 115 continues to traverse the hierarchy associated with the entertainment entity at 221-A2 and continues to traverse the hierarchy associated with the retail entity at 221-B2. At 221-A2, second model 115 identifies probabilities that exceed a threshold for sports and for movie and TV. At 221-B2, second model 115 identifies probabilities that exceed a threshold for furniture, electronics, and literature.

At 250, the second model 115 provides as output to model manager 116 a multi-labeled and hierarchical categorized string from the transaction. The categories assigned include "retailer is an entertainment merchant, streaming, video games, sports, and movie and TV" plus "retailer is a retail merchant, virtual, service retailer, electronics, literature, and furniture."

Model manager 116 provides the multi-entity labeled and multi categorized string to analytics system 125 via API 117. In an embodiment, model manager 116 provides the multi-entity labeled and multi categorized string to loyalty system associated with the FI that processed payment for the transaction, associated with cloud 110, and/or associated with the merchant that performed the transaction. The multi-entity labeled and multi categorized string provides for enhanced analytics and data science on the spending behaviors of consumers and/or of products of merchants in a manner that has heretofore not been possible because of insufficient categorizations of transactions.

In an embodiment, both first model 114 and second model 115 are provided as a single model. Thus, a single composite and comprehensive model is used rather than two separate models.

Figure 3:
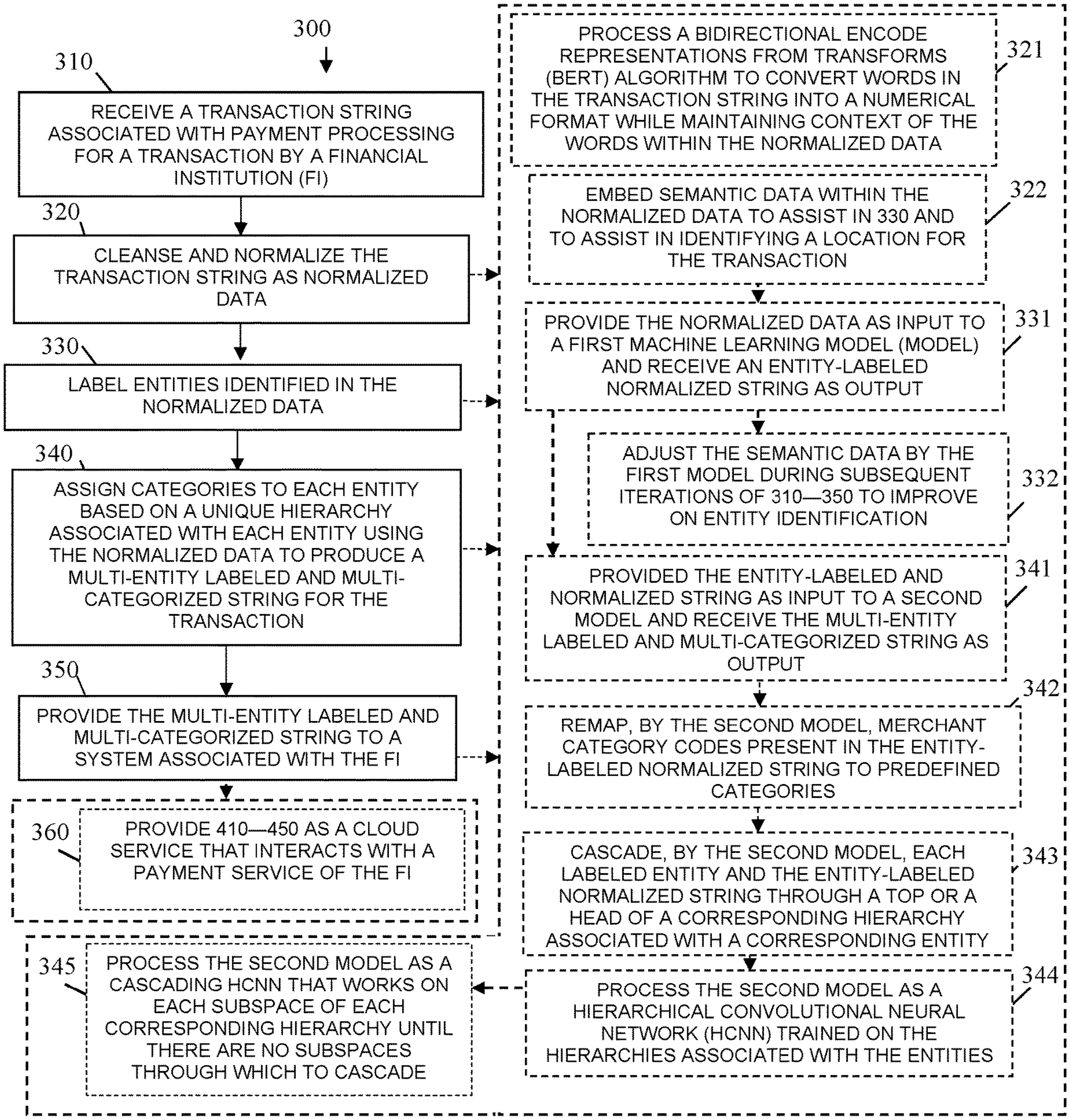
FIG. 3 is a flow diagram of a method for hierarchical and multi-label transaction cleansing and categorization, according to an example embodiment.

The above-referenced embodiments and other embodiments are now discussed with reference to FIGS. 3 and 4. FIG. 3 is a diagram of a method 300 for hierarchical and multi-label transaction cleansing and categorization, according to an example embodiment. The software module(s) that implements the method 300 is referred to as a "transaction data classifier." The transaction data classifier is implemented as executable instructions programmed and residing within memory and/or a non-transitory computer-readable (processor-readable) storage medium and executed by one or more processors of one or more devices. The processor(s) of the device(s) that executes the transaction data classifier are specifically configured and programmed to process the transaction data classifier. The transaction data classifier may have access to one or more network connections during its processing. The network connections can be wired, wireless, or a combination of wired and wireless.

In an embodiment, the device that executes the transaction data classifier is cloud 110. In an embodiment, the device that executes the transaction data classifier is server FI 120. In an embodiment, the transaction data classifier is 113, 114, 115, 116, and/or 117.

At 310, the transaction data classifier receives a transaction string associated with payment processing for a transaction by a FI. The transaction string includes, by way of example only, merchant provided descriptive text information and/or MCC information along with a transaction location and transaction price.

At 320, the transaction data classifier cleanses and normalizes the transaction data into normalized data. In an embodiment, at 321, the transaction data classifier processes a BERT algorithm to convert words in the transaction string into a numerical format while maintaining a context of the words within the normalized data. In an embodiment, at 322, the transaction data classifier embeds or adds semantic data within the normalized data to assist at 330 in labeling entities identified in the normalized data and to assist in identifying a location for the transaction.

At 330, the transaction data classifier labels entities identified in the normalized data. In an embodiment of 322 and at 331, the transaction data classifier provides the normalized data as input to a first model 114 and receives an entity-labeled normalized string as output from the first model 114. In an embodiment of 331 and at 332, the first model 114 adjust the semantic data during subsequent iterations of transaction data classifier (i.e., 310-350) to improve on entity identification and/or transaction location identification.

At 340, the transaction data classifier assigns categories to each entity based on a unique hierarchy associated with each entity using the normalized data to produce a multi-entity and multi-categorized string for the transaction. In an embodiment of 331 and at 340, at 341, the transaction data classifier provides the entity-labeled and normalized string as input to a second model 115. The transaction data classifier receives as output from the second model 115 a multi-entity labeled and multi-categorized string.

In an embodiment of 341 and at 342, the second model 115 remaps MCC present in the entity-labeled and normalized string to predefined categories. In an embodiment of 342 and at 343, the second model 115 cascades each labeled entity and the entity-labeled normalized string through a top or a head of a corresponding hierarchy associated with a corresponding entity. In an embodiment of 343 and at 344, the transaction data classifier processes the second model 115 as a HCNN trained on the hierarchies associated with the entities. In an embodiment of 344 and at 345, the transaction data classifier processes the second model 115 as a cascading HCNN that works on each subspace of each corresponding hierarch until there are no subspaces through which to cascade.

At 350, the transaction data classifier provides the multi-entity labeled and multi-categorized string to a system associated with the FI. In an embodiment, at 360, the transaction data classifier (i.e., 310-350) is provided as a cloud service that interacts with a payment service 123 of the FI.

Figure 4:
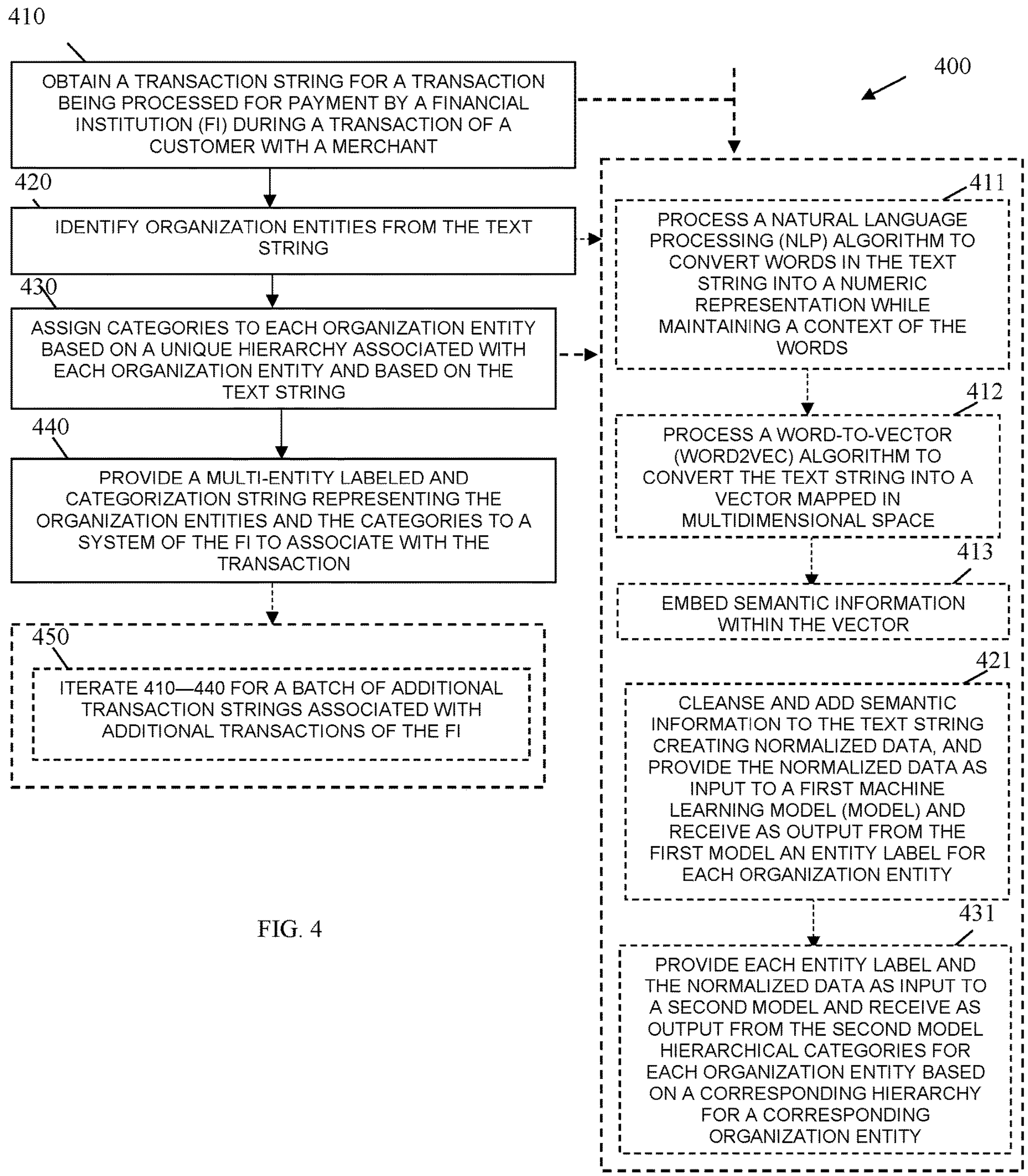
FIG. 4 is a flow diagram of another method for hierarchical and multi-label transaction cleansing and categorization, according to an example embodiment.

FIG. 4 is a diagram of another method 400 for hierarchical and multi-label transaction cleansing and categorization, according to an example embodiment. The software module (s) that implements the method 400 is referred to as a "hierarchical transaction data classifier." The hierarchical transaction data classifier is implemented as executable instructions programmed and residing within memory and/or a non-transitory computer-readable (processor-readable) storage medium and executed by one or more processors of one or more device(s). The processors that execute the hierarchical transaction data classifier are specifically configured and programmed for processing the hierarchical transaction data classifier. The hierarchical transaction data classifier may have access to one or more network connections during its processing. The network connections can be wired, wireless, or a combination of wired and wireless.

In an embodiment, the device that executes the hierarchical transaction data classifier is cloud 110. In an embodiment, the device that executes the hierarchical transaction data classifier is FI server 120. In an embodiment, the hierarchical transaction data classifier is 113, 114, 115, 116, 117, 125, and/or method 300. The hierarchical transaction data classifier presents another and, in some ways, enhanced processing perspective from that which were discussed above for system 100 and method 300.

At 410, the hierarchical transaction data classifier obtains a transaction string for a transaction being processed for payment by a FI during a transaction between a customer with a merchant. The transaction string is provided from the merchant to a payment service 123 of the FI. In an embodiment, the hierarchical transaction data classifier obtains the transaction string from the payment service 123 in real time or near real time as payment processing is being performed for the transaction.

In an embodiment, at 411, the hierarchical transaction data classifier processes an NLP algorithm to convert words in the text string to a numeric representation while maintaining a context of the words. In an embodiment of 411 and at 412, the hierarchical transaction data classifier processes a Word2Vec algorithm to convert the text string into a vector mapped in a multidimensional space. In an embodiment of 412 and at 413, the hierarchical transaction data classifier embeds semantic information within the vector.

At 420, the hierarchical transaction data classifier identifies organization entities from the text string. In an embodiment, at 421, the hierarchical transaction data classifier cleanses and adds semantic information to the text string creating normalized data, and the hierarchical transaction data classifier provides the normalized data as input to a first model 114. The hierarchical transaction data classifier receives as output from the first model 114 an entity label for each organization entity.

At 430, the hierarchical transaction data classifier assigns categories to each organization entity based on a unique hierarchy associated with each organization entity and based on the text string. In an embodiment of 421 and 430, at 431, the hierarchical transaction data classifier provides each entity label and the normalized data as input to a second model 115. The hierarchical transaction data classifier receives as output from the second model 115 hierarchical categories for each organization entity based on a corresponding hierarchy for a corresponding organization entity.

At 440, the hierarchical transaction data classifier provides a multi-entity labeled and categorization string representing the organization entities and the categories to a system of the FI to associate with the transaction. In an embodiment, at 450, the hierarchical transaction data classifier (i.e., 410-440) iterates for a batch of additional transaction strings associated with additional transactions of the FI.

It should be appreciated that where software is described in a particular form (such as a component or module) this is merely to aid understanding and is not intended to limit how software that implements those functions may be architected or structured. For example, modules are illustrated as separate modules, but may be implemented as homogenous code, as individual components, some, but not all of these modules may be combined, or the functions may be implemented in software structured in any other convenient manner.

Furthermore, although the software modules are illustrated as executing on one piece of hardware, the software may be distributed over multiple processors or in any other convenient manner.

The above description is illustrative, and not restrictive. Many other embodiments will be apparent to those of skill in the art upon reviewing the above description. The scope of embodiments should therefore be determined with reference to the appended claims, along with the full scope of equivalents to which such claims are entitled.

In the foregoing description of the embodiments, various features are grouped together in a single embodiment for the purpose of streamlining the disclosure. This method of disclosure is not to be interpreted as reflecting that the claimed embodiments have more features than are expressly recited in each claim. Rather, as the following claims reflect, inventive subject matter lies in less than all features of a single disclosed embodiment. Thus, the following claims are hereby incorporated into the Description of the Embodiments, with each claim standing on its own as a separate exemplary embodiment.

The invention claimed is:

1. A method, comprising:

receiving a transaction string associated with payment processing for a transaction by a financial institution (FI);

cleansing and normalizing the transaction string as normalized data;

labeling entities identified in the normalized data;

wherein labeling further includes:

providing the normalized data as input to a first machine learning model trained on named entity recognition, the first machine learning model processing a bidirectional encoder representations from transformers (BERT) algorithm that converts words in the transaction string into a numerical format while maintaining context of the words within the normalized data;

adjusting embeddings of each word during training to learn context of where merchants appear in transaction strings; and receiving an entity-labeled normalized string as output from the first machine learning model; and assigning categories to each entity based on a unique hierarchy associated with each entity using the normalized data to produce a multi-entity labeled and multi-categorized string for the transaction;

wherein assigning further includes:

providing the entity-labeled normalized string as input to a second machine learning model comprising a hierarchical convolutional neural network (HCNN) trained on hierarchies associated with the entities, wherein the second machine learning model remaps merchant category codes present in the entity-labeled normalized string to predefined categories and cascades each labeled entity and the entity-labeled normalized string through a top of a corresponding hierarchy associated with a corresponding entity as a cascading HCNN that works on each subspace of each corresponding hierarchy until there are no subspaces through which to cascade;

receiving the multi-entity labeled and multi-categorized string as output from the second machine learning model, wherein probabilities assigned to categories are independent such that sum of category probabilities do not equal 1, enabling multiple categories to be simultaneously assigned to a single transaction; and providing the multi-entity labeled and multi-categorized string to a system associated with the FI for subsequent analytics.

2. The method of claim 1, wherein cleansing further includes embedding semantic data within the normalized data to assist in labeling and to assist in identifying a location for the transaction.

3. The method of claim 2 further comprising, adjusting the semantic data by the first machine learning model during subsequent iterations of the method to improve on entity identification.

4. The method of claim 1, wherein providing the entity-labeled normalized string as input to the second machine learning model further includes cascading, by the second machine learning model, each labeled entity and the entity-labeled normalized string through a top or a head of a corresponding hierarchy associated with a corresponding entity.

5. The method of claim 1 further comprising, providing the method as a cloud service that interacts with a payment service of the FI.

6. A non-transitory computer-readable storage medium comprising executable instructions that when executed by at least one processor perform operations, comprising:

receiving a transaction string associated with payment processing for a transaction by a financial institution (FI);

cleansing and normalizing the transaction string as normalized data;

labeling entities identified in the normalized data;

wherein labeling further includes:

providing the normalized data as input to a first machine learning model trained on named entity recognition, the first machine learning model processing a bidirectional encoder representations from transformers (BERT) algorithm that converts words in the transaction string into a numerical format while maintaining context of the words within the normalized data;

adjusting embeddings of each word during training to learn context of where merchants appear in transaction strings; and receiving an entity-labeled normalized string as output from the first machine learning model; and assigning categories to each entity based on a unique hierarchy associated with each entity using the normalized data to produce a multi-entity labeled and multi-categorized string for the transaction;

wherein assigning further includes:

providing the entity-labeled normalized string as input to a second machine learning model comprising a hierarchical convolutional neural network (HCNN) trained on hierarchies associated with the entities, wherein the second machine learning model remaps merchant category codes present in the entity-labeled normalized string to predefined categories and cascades each labeled entity and the entity-labeled normalized string through a top of a corresponding hierarchy associated with a corresponding entity as a cascading HCNN that works on each subspace of each corresponding hierarchy until there are no subspaces through which to cascade;

receiving the multi-entity labeled and multi-categorized string as output from the second machine learning model, wherein probabilities assigned to categories are independent such that sum of category probabilities do not equal 1, enabling multiple categories to be simultaneously assigned to a single transaction; and providing the multi-entity labeled and multi-categorized string to a system associated with the FI for subsequent analytics.

7. The non-transitory computer-readable storage medium of claim 6, wherein cleansing further includes embedding semantic data within the normalized data to assist in labeling and to assist in identifying a location for the transaction.

8. The non-transitory computer-readable storage medium of claim 7 further comprising, adjusting the semantic data by the first machine learning model during subsequent iterations of the executable instructions to improve on entity identification.

9. The non-transitory computer-readable storage medium of claim 6, wherein providing the entity-labeled normalized string as input to the second machine learning model further includes cascading, by the second machine learning model, each labeled entity and the entity-labeled normalized string through a top or a head of a corresponding hierarchy associated with a corresponding entity.

10. The non-transitory computer-readable storage medium of claim 6 further comprising, providing the executable instructions as a cloud service that interacts with a payment service of the FI.

11. A system, comprising:

at least one processor comprising a non-transitory computer-readable storage medium with instructions; and the instructions when executed by the at least one processor cause the at least one processor to perform operations, comprising:

receiving a transaction string associated with payment processing for a transaction by a financial institution (FI);

cleansing and normalizing the transaction string as normalized data;

labeling entities identified in the normalized data;

wherein labeling further includes:

providing the normalized data as input to a first machine learning model trained on named entity recognition, the first machine learning model processing a bidirectional encoder representations from transformers (BERT) algorithm that converts words in the transaction string into a numerical format while maintaining context of the words within the normalized data;

adjusting embeddings of each word during training to learn context of where merchants appear in transaction strings; and receiving an entity-labeled normalized string as output from the first machine learning model; and assigning categories to each entity based on a unique hierarchy associated with each entity using the normalized data to produce a multi-entity labeled and multi-categorized string for the transaction;

wherein assigning further includes:

providing the entity-labeled normalized string as input to a second machine learning model comprising a hierarchical convolutional neural network (HCNN) trained on hierarchies associated with the entities, wherein the second machine learning model remaps merchant category codes present in the entity-labeled normalized string to predefined categories and cascades each labeled entity and the entity-labeled normalized string through a top of a corresponding hierarchy associated with a corresponding entity as a cascading HCNN that works on each subspace of each corresponding hierarchy until there are no subspaces through which to cascade;

receiving the multi-entity labeled and multi-categorized string as output from the second machine learning model, wherein probabilities assigned to categories are independent such that sum of category probabilities do not equal 1, enabling multiple categories to be simultaneously assigned to a single transaction; and providing the multi-entity labeled and multi-categorized string to a system associated with the FI for subsequent analytics.

12. The system of claim 11, wherein cleansing further includes embedding semantic data within the normalized data to assist in labeling and to assist in identifying a location for the transaction.

13. The system of claim 12 further comprising, adjusting the semantic data by the first machine learning model during subsequent iterations of the instructions to improve on entity identification.

14. The system of claim 11, wherein providing the entity-labeled normalized string as input to the second machine learning model further includes cascading, by the second machine learning model, each labeled entity and the entity-labeled normalized string through a top or a head of a corresponding hierarchy associated with a corresponding entity.

15. The system of claim 11 further comprising, providing the instructions as a cloud service that interacts with a payment service of the FI.

* * * * *